(12) United States Patent
Bataille (10) Patent No.: US 9,746,993 B2
(45) Date of Patent: Aug. 29, 2017

(54) MEASUREMENT DATA DISPLAY DEVICE

(71) Applicant: HORIBA, LTD., Kyoto (JP)

(72) Inventor: Julien Bataille, Kyoto (JP)

(73) Assignee: HORIBA, LTD., Kyoto (JP)

( * ) Notice: Subject to any disclaimer, the term of this patent is extended or adjusted under 35 U.S.C. 154(b) by 205 days.

(21) Appl. No.: 14/377,320

(22) PCT Filed: Feb. 7, 2013

(86) PCT No.: PCT/JP2013/052917
§ 371 (c)(1),
(2) Date: Aug. 7, 2014

(87) PCT Pub. No.: WO2013/118837
PCT Pub. Date: Aug. 15, 2013

(65) Prior Publication Data
US 2015/0007097 A1 Jan. 1, 2015

(30) Foreign Application Priority Data
Feb. 8, 2012 (JP) ................................ 2012-025624

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0481* (2013.01); *G06F 3/0484* (2013.01);
(Continued)

(58) Field of Classification Search
CPC ......... H04L 67/18; H04L 67/22; H04L 67/02; H04L 51/32; H04L 67/306;
(Continued)

(56) References Cited

U.S. PATENT DOCUMENTS

| | | |
|---|---|---|
| 2002/0078035 A1 | 6/2002 | Frank et al. |
| 2007/0075251 A1 | 4/2007 | Doughty et al. |

(Continued)

FOREIGN PATENT DOCUMENTS

| | | |
|---|---|---|
| CN | 2690896 | 4/2005 |
| CN | 101137155 | 3/2008 |

(Continued)

OTHER PUBLICATIONS

"http://ramap.jmc.or.jp/map/mapdf/pdf/car/v01/dr/5640-D.pdf>", Ministry of Education, Culture, Sport, Science and Technology, Monbu Kagakusho ni yoru Hoshasenryo to Bunpu Map (senryo Sokutei Map no Sakusei ni Tsuite (online), Aug. 2, 2011, pp. 1-3.

(Continued)

*Primary Examiner* — Di Xiao
(74) *Attorney, Agent, or Firm* — Greenblum & Bernstein, P.L.C.

(57) ABSTRACT

A measurement data display device includes a screen displaying at least one icon representing a data file in which measurement and location data indicating a location where the measurement data was measured are recorded in association with each other, and also displays a window for displaying a map; and a display control part controlling display on the screen. When the icon is moved onto the window, the display control part displays a predetermined type of symbol determined in advance depending on a value of the measurement data at a position on the map indicated by the location data corresponding to the measurement data. The measurement data display device allows the measurement data measured at an arbitrary location to be displayed with only a simple screen operation, at a location on the map corresponding to the place where the measurement was performed and for each time the measurement was performed.

14 Claims, 5 Drawing Sheets

(51) Int. Cl.
*G06T 11/00* (2006.01)
*G06F 3/0484* (2013.01)
*G09B 29/00* (2006.01)
*G06T 11/20* (2006.01)

(52) U.S. Cl.
CPC ............ *G06T 11/00* (2013.01); *G06T 11/206* (2013.01); *G09B 29/007* (2013.01)

(58) Field of Classification Search
CPC ..... H04L 12/1818; H04L 41/22; H04L 51/20; H04L 65/403; H04L 67/2823; H04L 12/1813; H04L 12/2809
See application file for complete search history.

(56) References Cited

U.S. PATENT DOCUMENTS

| | | | |
|---|---|---|---|
| 2008/0057911 | A1 | 3/2008 | Lauper |
| 2008/0120122 | A1* | 5/2008 | Olenski .................. G01C 15/00 705/1.1 |
| 2009/0037101 | A1* | 2/2009 | Koike ................. G01C 21/3664 701/533 |
| 2009/0083657 | A1 | 3/2009 | Tsuji |
| 2009/0113990 | A1* | 5/2009 | Groves ................ G01N 1/2273 73/31.01 |
| 2010/0228469 | A1 | 9/2010 | Varadarajan |
| 2010/0253509 | A1 | 10/2010 | Fu et al. |
| 2011/0246875 | A1* | 10/2011 | Parker ................. G06F 3/04845 715/702 |
| 2011/0288895 | A1* | 11/2011 | Perez, Jr. ............... G06Q 10/06 705/7.12 |
| 2012/0023446 | A1 | 1/2012 | Minde |
| 2012/0027289 | A1* | 2/2012 | Naruse .................... G06T 7/001 382/152 |
| 2013/0097544 | A1* | 4/2013 | Parker .................. G09B 29/003 715/771 |

FOREIGN PATENT DOCUMENTS

| | | |
|---|---|---|
| CN | 101387704 | 3/2009 |
| JP | 8-334563 | 12/1996 |
| JP | 2003-524259 | 8/2003 |
| JP | 3118287 | 1/2006 |
| JP | 2008-170249 | 7/2008 |
| JP | 2011-117969 | 6/2011 |
| JP | 2011-227521 | 11/2011 |
| WO | WO 01/63479 | 8/2001 |
| WO | 2010/113650 | 10/2010 |

OTHER PUBLICATIONS

Minoru Tanigaki, "http://www.c-technol.co.jp/pdf/420FBN.pdf>KURAMA no Kaihatsu to Un'yo FBnews, (online)", , Dec. 1, 2011, pp. 6-10, vol. 420.
Search report from International Bureau of WIPO, mail date is May 14, 2013.
Exetended European Search Report issued in Patent Application No. 13747209.8, dated Mar. 3, 2016.
Chinese Office Action issued in Application No. 201380008171.2, dated Apr. 20, 2016 , along with an english translation thereof.
Japanese Office Action issued in JP Application No. 2013-557575, dated Mar. 14, 2017 , along with an english translation thereof.
Japanese Decision to Grant issued in JP Application No. 2013-557575, dated Jul. 7, 2017, along with an english translation thereof.

* cited by examiner

| TIME | RADIATION DOSE (μSv/h) | LOCATION | |
|---|---|---|---|
| | | LATITUDE/ LONGITUDE | ALTITUDE (m) |
| 2012-01-28T10:36:21 | 0.521 | 37.60424932 140.97030602 | 54.3 |
| 2012-01-28T10:36:31 | 0.522 | 37.60424943 140.97030612 | 54.7 |
| 2012-01-28T10:36:41 | 0.520 | 37.60424935 140.97030620 | 55.0 |
| 2012-01-28T10:36:51 | 0.522 | 37.60424929 140.97030615 | 54.8 |
| .... | .... | .... | .... |
| 2012-01-28T10:45:21 | 0.526 | 37.60424210 140.9703365 | 65.4 |

MEASUREMENT DATA DISPLAY DEVICE

TECHNICAL FIELD

The present invention relates to a measurement data display device that displays pieces of measurement data measured at arbitrary locations, such as environmental radiation doses, on a map corresponding to the respective locations.

BACKGROUND ART

In recent years, in a living space near one's own residential area and including the residential area, a demand to measure environmental radiation doses has been increasing. In response to such a demand, portable dosimeters for measuring environmental radiation doses are starting to spread.

For example, an environmental radiation monitoring apparatus described in Patent Literature 1 includes: many mobile slave stations that measure radiation doses at measuring sites; and a master station that performs data processing in a location distant from the slave stations, and is configured such that each of the slave stations is provided with: a GPS receiver that senses its installation location; a radiation measuring device that measures a radiation dose at regular time intervals, and a data transmission device that wirelessly transmits sensed location data and measured radiation dose data to the master station, and the master station is provided with: a data reception device that receives location data and radiation dose data transmitted from each of the slave stations; and a data processor that performs data processing for instantaneously storing pieces of received dada in a database to draw a contour map of a radiation dose rate in real time, and superimposing the contour map on a geographical information system to create an image as a radiation dose rate map of a measurement area.

However, in the conventional radiation monitoring apparatus, a user interface used at the time of plotting pieces of radiation measurement data on a map is not considered at all.

Also, many problems related to a user interface still remain unsolved, such that it becomes extremely hard to read the map due to complexity of the map and operability becomes worse at the time of selecting measurement data to display the data on the map when displaying all peaces of measurement data.

Further, such problems occur not only in a radiation measuring device but also in measuring devices used in the case where a relationship between a measurement location and measurement data has a significant meaning, such as measuring devices for environmental states such as $CO_2$ concentration, NOx concentration, and a pH level, and mobile type vehicle measuring device such as a tachograph. That is, in the case of frequently moving to make measurements at respective locations, or installing measuring devices at many spots, reflecting pieces of measurement data on a map with the simplest possible operation is considered to be an important challenge for many people to know a value distribution or the like of the pieces of measurement data.

CITATION LIST

Patent Literature

Patent Literature 1 JP-A-8-334563

SUMMARY OF INVENTION

Technical Problem

Therefore, the present invention is made in order to solve the above-described problems, and a main object thereof is to provide a user-friendly measurement data display device that can reflect pieces of measurement data measured at arbitrary locations, such as radiation doses, on a map only with a simple screen operation.

Solution to Problem

That is, the measurement data display device according to the present invention is provided with: a screen that displays at least one icon representing a data file in which measurement data measured by a predetermined measuring device and location data indicating a location where the measurement data was measured are recorded in association with each other, and also displays a window for displaying a map; a display control part that controls display on the screen; wherein when the icon is moved onto the window, the display control part displays a predetermined type of symbol determined in advance depending on a value of the measurement data at a position on the map, the position being indicated by the location data corresponding to the measurement data.

According to such a configuration, the symbol associated with the measurement data in the data file indicated by the icon is displayed on the map corresponding to the measurement location, with only an intuitively understandable operation of moving the icon onto the window, and therefore the measurement value at the measurement location can be grasped. Also, an icon is separately displayed for each series of pieces of measurement data, and a user can select only desired pieces of measurement data with an icon, so that it is possible to easily prevent map display from becoming unnecessarily complicated.

It is preferable that the data file is formed by further associating the measurement data with time data indicating time when the measurement data was measured. In the case where there are multiple pieces of measurement data measured at the same location or at close locations although corresponding measurement times are different, the accompanying of corresponding pieces of time data can make a map easy to see in such a way that, for example, the display control part selects only the latest measurement data to map a symbol corresponding to the measurement data, or displays the latest measurement data in the forefront of the map. The present invention can provide not only a display of the latest measurement data but also a mapping display of, for example, only pieces of measurement data measured during a certain period in the past.

In order to make it possible to simultaneously grasp pieces of measurement data at different locations, it is preferable that, when a plurality of icons are collectively moved onto the window, the display control part displays all pieces of measurement data in a data file corresponding to each of the icons on the map with a plurality of symbols. In this case, the display control device may be one that sets a scale of the map such that a plurality of the symbols corresponding to all pieces of measurement data contained in a data file corresponding to each of the icons moved onto the window are displayed within the window. On the other hand, as pieces of measurement data to be displayed on the window, pieces of measurement data may be partially thinned so as to include not all the pieces of measurement data contained in a data file but at least one of pieces of measurement data measured at the same location or at close locations. That is, the present invention may be adapted to display all pieces of measurement data in association with different locations determined from pieces of location data.

In order to make the number of additional functions of the measuring device as small as possible to reduce cost, it is preferable to utilize a portable terminal that has a GPS receiving device, to which the location data acquired through the GPS receiving device can be added. For example, the measurement data display device may be one that makes the portable terminal create the data file by associating the location data with the measurement data transmitted from the measuring device, which is portable, and makes the portable terminal input (transmit) the data file to the display control part.

The portable terminal may be a smartphone that receives the measurement data from the dosimeter through short range wireless communication or wired communication. The short range wireless communication and the wired communication may be Bluetooth-based communication and wired communication through a USB cable, respectively. Since a distance between the measuring device and the smartphone is short in the case of a smartphone equipped with a Bluetooth device or the like as described, it is possible to reduce the possibility that location data corresponding to measurement data is different from data on a location where the measurement data was measured, i.e., to reduce the possibility of obtaining location data on a displaced location, thereby increasing accuracy of location data. In addition, the portable terminal may also be a tablet computer that can be connected to the Internet, has a locating mechanism such as a GPS receiving device, and further has a short range wireless or wired communication function.

In order to increase visibility of the measurement data, it is preferable that the symbol is color-coded depending on the value of the measurement data.

Advantageous Effects of Invention

According to the present invention configured as described, only with a simple operation of moving an icon onto the window, symbols related to pieces of measurement data in a data file indicated by the icon are displayed on a map, and therefore a tendency of measurement values in a specified area or regional measurement value can be easily grasped.

REFERENCE SIGNS LIST

1 Measurement data display device
2 Computer
3 Screen
5 Dosimeter
6 Smartphone
9 Icon
11 Window
12 Dot
13 Map

DESCRIPTION OF EMBODIMENTS

In the following, one embodiment of the present invention is described referring to the drawings.

Figure 1:
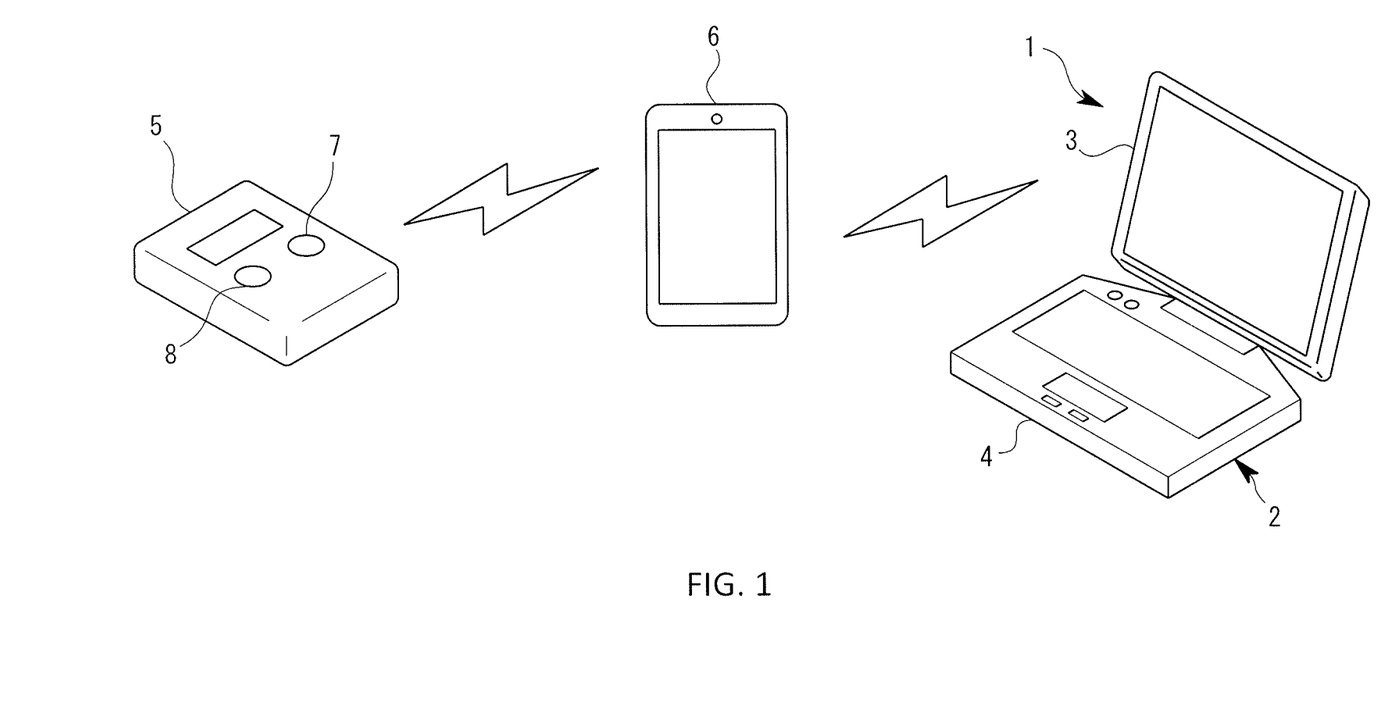
FIG. 1 is a schematic overall diagram illustrating a configuration of a measurement data display device in one embodiment of the present invention.

A measurement data display device 1 according to the present embodiment is realized by a notebook computer 2 as illustrated in FIG. 1. The notebook computer 2 includes a screen 3, and a computer main body 4 integrated with input devices including a keyboard. The notebook computer 2 may be replaced by an information processor such as a desktop computer including a display device and a computer main body.

Figure 2:
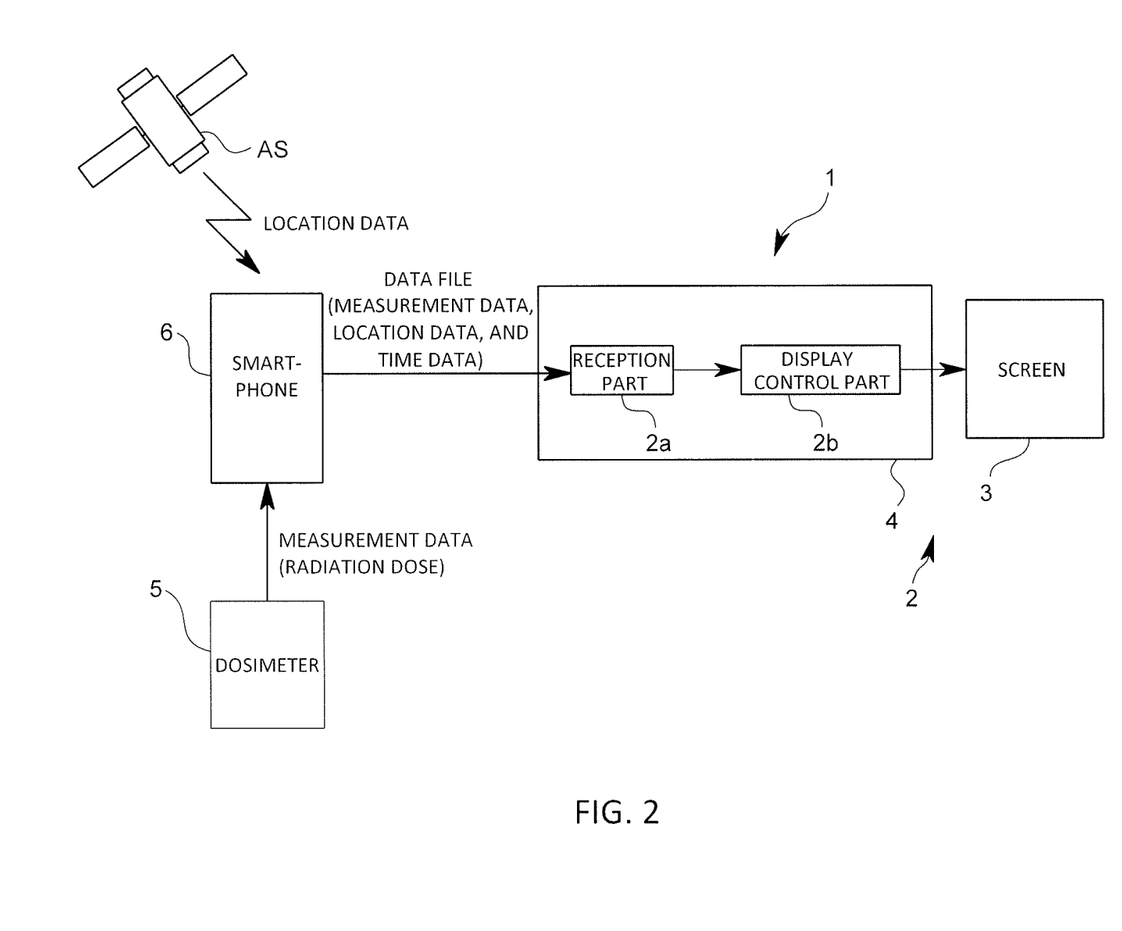
FIG. 2 is a functional block diagram illustrating an overall configuration in the same embodiment.

A system for transmitting measurement data to the measurement data display device 1 is, as illustrated in FIGS. 1 and 2, configured to include: a dosimeter 5 as a portable measuring device that measures environmental radiation doses; and a smartphone 6 that is a communicable portable terminal that receives pieces of measurement data on environmental radiation doses measured by the dosimeter 5.

The respective parts are described.

Structurally, the notebook computer 2 has a CPU, an internal memory, a storage device such as a hard disk, an I/O interface, a communication interface, and the like. The notebook computer 2 is one that fulfills various types of functions in such a way that the CPU operates on the basis of various types of application software (hereinafter referred to as programs) stored in the storage device. The storage device stores system software, a communication program, a mail program, a program for displaying radiation doses on a map (hereinafter referred to as a display program), and the like. As illustrated in FIG. 2, the computer main body 4 of the notebook computer 2 functions as: a reception part 2a that receives measurement data from the smartphone 6 via, for example, email; and a display control part 2b that controls display on the screen 3.

The dosimeter 5 is one that utilizes an unillustrated scintillator, and that captures a radiation such as a γ-ray incoming from outside to measure doses of the radiation with an optical receiver or a counter, and outputs measurement data indicating a radiation dose per unit time. Needless to say, the dosimeter 5 may be one that measures a radiation in another manner.

Also, the dosimeter 5 is equipped with a Bluetooth function as a short range wireless communication function. During measurement of environmental radiation doses, the dosimeter 5 transmits measurement data to the smartphone 6 as a portable terminal in real time through the Bluetooth function. Accordingly, in the case of measuring environmental radiation doses with the dosimeter 5, the smartphone 6 should be always carried, and the smartphone 6 should be set in a state of being able to receive measurement data through the Bluetooth function. The measurement of environmental radiation doses is performed in such a way as to repeatedly measure an environmental radiation dose at regular intervals, for example, at intervals of 10 seconds by operating a power switch 7 of the dosimeter 5 to power on the dosimeter 5, and to stop the measurement by operating the power switch 7 to power off the dosimeter 5. Specifically, the dosimeter 5 adds up measurement values measured during a period of, for example, 60 seconds, calculates a moving average of the measurement values to obtain an environmental radiation dose per hour (microsieverts/hour), creates measurement data at intervals of 10 seconds, and outputs the measurement data to a simplified display of the dosimeter 5. Also, such measurement data is transmitted to the smartphone 6 one by one without being accumulated in the dosimeter 5. In addition, reference sign 8 represents a switch for turning on/off a built-in buzzer.

The smartphone 6 is of a type equipped with a GPS (Global Positioning System) function as a locating function, and receives a radio wave from a GPS satellite AS to acquire location data. Location data is configured to include longitudinal data, latitudinal data, and altitudinal data. Note that altitudinal data is not necessarily required. Upon receipt of measurement data from the dosimeter 5, the smartphone 6 creates a data file DF in association with the measurement data, time data corresponding to the time of receiving the measurement data, and location data corresponding to the location at the time of receiving the measurement data. As described above, in a measurement continuation state, the smartphone 6 creates one data file DF by associating each of pieces of measurement data received in the state with corresponding location data and time data. In place of the smartphone, a portable terminal having a locating function can also be used, such as a notebook computer or a tablet computer.

Figure 3:
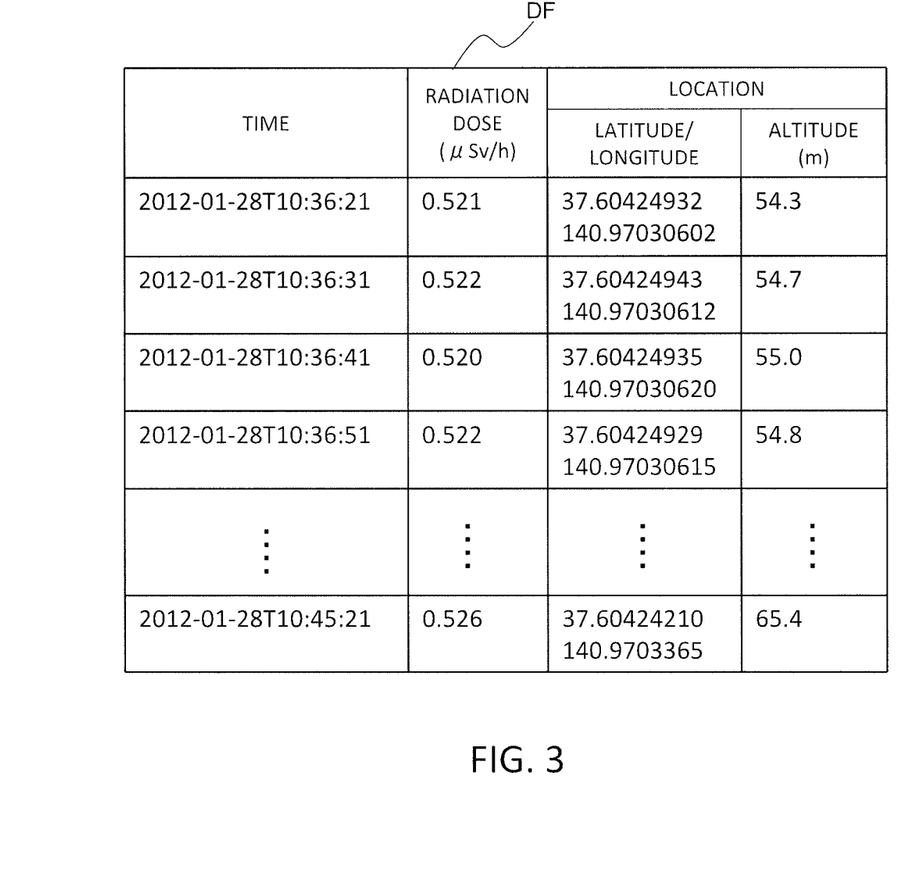
FIG. 3 is a table listing contents of a data file in the same embodiment.

A data file DF is, as illustrated in FIG. 3, for example, a CSV (Comma-Separated Values) file. For one round of measurement by the dosimeter 5, i.e., for measurement during a period from a point of powering on the dosimeter 5 or the Bluetooth function to a point of powering off the dosimeter 5 or the Bluetooth function, one data file DF is created. For example, in the case of operating the power switch 7 to switch off the power switch 7 substantially one minute after switching on, one data file DF is created from one piece of measurement data, and location data and time data related to the measurement data.

On the other hand, in the case of continuously keeping the power switch 7 in the on state for approximately 10 minutes, and then switching off the power switch 7, the measurement of environmental radiation doses is repeatedly performed at the regular intervals, and therefore one data file DF is created from a series of pieces of measurement data measured at the regular intervals, i.e., multiple pieces of measurement data, and sets of location data and time data respectively corresponding to the pieces of measurement data. A data file DF created as described above is transmitted from the smartphone 6 to the notebook computer 2.

A data file DF is transmitted to the notebook computer 2 by, for example, in the case where the notebook computer 2 is placed far away, being attached to mail. On the other hand, in the case where the notebook computer 2 is present near the smartphone 6, and the Bluetooth function is available, a data file DF is transmitted to the notebook computer 2 through the Bluetooth function, or in the case where a USB cable is available, a data file DF is transmitted through USB connection. In addition, the present invention may be adapted to perform direct transmission from the dosimeter 5 to the notebook computer through the Bluetooth function or the USB cable to create a data file DF. A data file DF transmitted to and stored in the notebook computer 2 is stored in a specified area of the storage device, and an icon 9 for the data file DF is directly displayed or displayed as a folder containing the data file DF on the screen 3 of the notebook computer 2, i.e., on a desktop 10. In the example illustrated in FIG. 4, icons 9 are displayed on the desktop 10.

Figure 4:
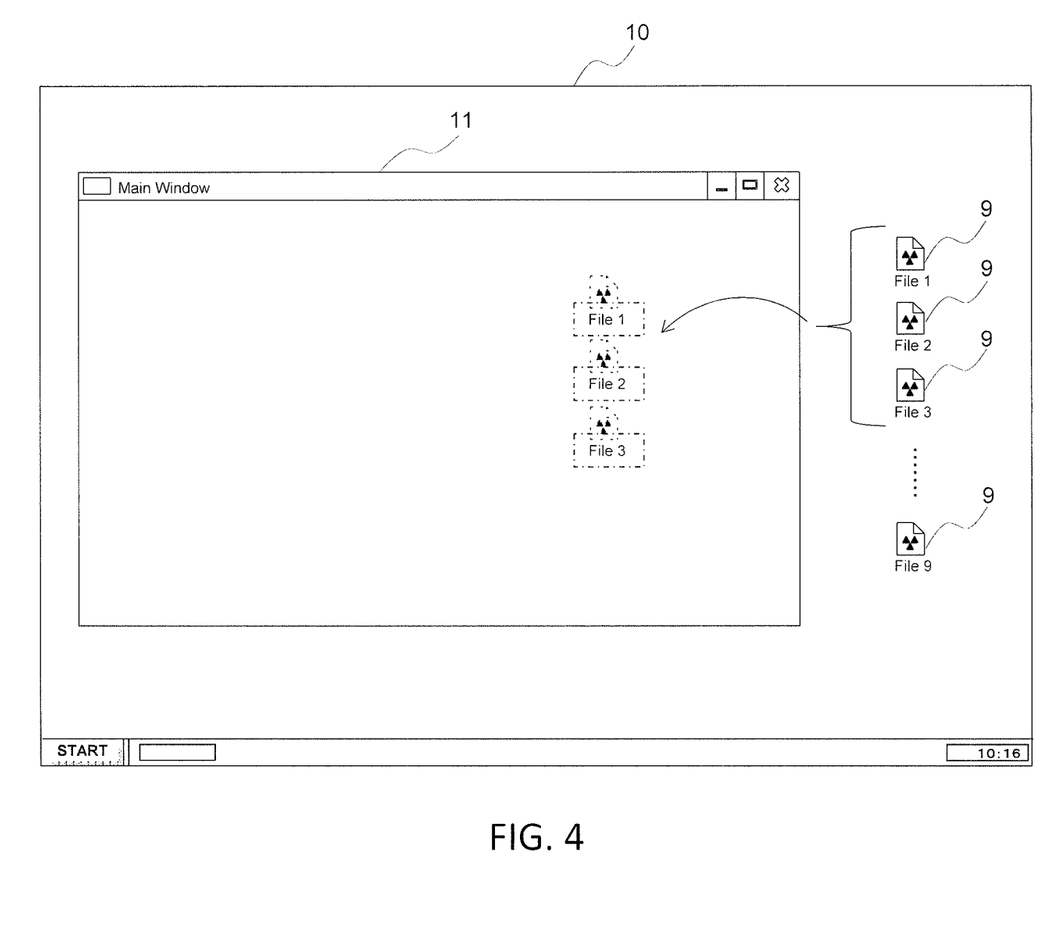
FIG. 4 is a screen diagram illustrating contents displayed on the display device in the same embodiment.

In the case of starting the display program on the notebook computer 2 in the above configuration, a window 11 is displayed on the desktop 10 of the screen 3 as illustrated in FIG. 4, and in the window 11, an arbitrary map (not illustrated) is displayed. The arbitrary map may be any of maps such as a world map showing the whole world, a map showing Japan and its surrounding areas, and a map showing the Kinki region. Also, the window 11 may be one that displays a default map.

Figure 5:
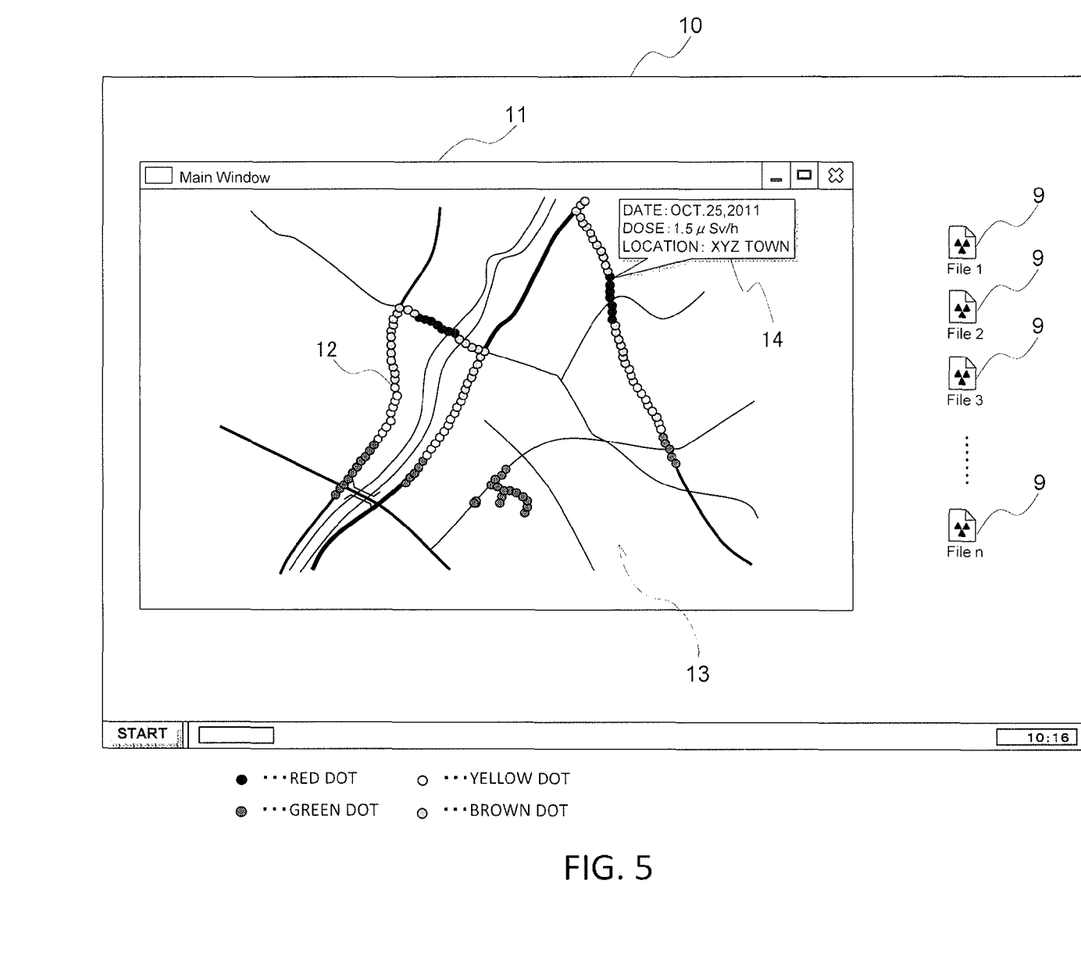
FIG. 5 is a screen diagram illustrating contents displayed on the display device in the same embodiment.

Next, by moving one or more icons 9 into the window 11, i.e., by dragging (and dropping) the icons 9 onto the window 11, as illustrated in FIG. 4, circular dots 12 each of which is a symbol having a predetermined appearance preliminarily determined depending on a value of corresponding measurement data in data files DF represented by the icons 9 are displayed on a map 13 on the window 11 as illustrated in FIG. 5. Each of the symbols may be, in addition to the circular dot, a polygonal dot such as a square dot or an equilateral triangular dot. Also, the present invention may be adapted to combine a shape and a color to be able to distinguish a radiation dose among pieces of measurement data.

In FIG. 5, a scale of the map is set to the maximum scale on which in the window 11, all pieces of measurement data are included and their corresponding symbols are displayed.

First, in the case of dragging and dropping an icon 9 for a data file DF containing one piece of measurement data, a map 13 including a position corresponding to location data contained in the data file DF is displayed on the window 11, and at the position corresponding to the location data on the map 13, the measurement data is displayed with a colored dot 12. That is, the measurement data is displayed with the dot 12 that is color-coded depending on a value of an environmental radiation dose. Respective dots 12 are set so as to be able to intuitively grasp environmental radiation doses, such as green, yellow, brown, and red dots 12 respectively set to correspond to low, middle, high, and alert levels.

Next, in the case where multiple pieces of measurement data are contained in one data file DF, each of the pieces of measurement data is related to corresponding time data and location data, and displayed with a dot 12 on a map 13 in the window 11. That is, in the case of multiple pieces of measurement data, all the pieces of measurement data are collectively displayed on a one-screen map 13. In this case, regarding pieces of measurement data at an unchanged measurement location, dots corresponding to the pieces of measurement data are displayed at the same location one after another in time series. On the other hand, in the case of multiple pieces of measurement data at measurement locations as a result of changing with time, the respective pieces of measurement data were acquired at the regular intervals, and therefore displayed on a map 13 as a line formed by a series of dots in contact with each other. In the case where respective pieces of measurement data are different in value, the pieces of measurement data are displayed as a line formed by a series of differently colored dots 12. In addition, in the case where there are multiple pieces of measurement data respectively measured at different measurement times but measured at the same location or close locations, the present invention may be adapted to be able to easily see the pieces of measurement data by, for example, selecting only the latest measurement data to map a symbol corresponding to the measurement data, or displaying the latest measurement data in the forefront of a map.

Differently from the above-described cases, in the case of dragging and dropping a plurality of data files DF into the window 11, one or more pieces of measurement data in each of the data files DF are all displayed with dots 12 on one and the same map 13. In other words, it is not that for each of the data files DF, a window 11 is opened, and in each window 11, a map 13 is displayed, but that on the map 13 representing an area covering all pieces of location data contained in each of the data files DF, pieces of measurement data are collectively displayed. In this case, even in the case where locations where one or more pieces of measurement data in each of the data files DF are acquired are not within a short distance area such as a city, town, or village, but within a long distance area such as a prefecture or a nation, dots 12 corresponding to pieces of measurement data contained in all of the data files DF are displayed on the same map 13.

In the case of placing a mouse cursor on a dot 12 in a state where dots 12 are displayed on a map 13, as illustrated in FIG. 5, respective values of time data, measurement data, and location data corresponding to the dot 12 are displayed in a balloon 14 as characters. Accordingly, rough values of pieces of measurement data can be grasped with corresponding dots 12, and also details such as measurement data corresponding to each dot 12 can be grasped. In this case, a balloon 14 is displayed only by placing the mouse cursor on a dot 12, and therefore by moving the mouse cursor along displayed dots 12, details such as pieces of measurement data can be successively seen.

As described, even pieces of measurement data dotted in a wide range can be displayed on one and the same map 13, and therefore a scale of a map 13 displayed in the window 11 is not always constant, but changed by the display control par 2b correspondingly to pieces of location data contained in a dragged data file DF. That is, in the case of dragging and dropping onto the window 11 the above-described one data file DF where there is a plurality of measurement locations, and the locations spread out over the wide range, or dragging and dropping into the window 11 a plurality of data files DF created at locations mutually separated at distances between prefectures, a scale tends to decrease. Accordingly, how an environmental radiation dose changes depending on a measurement location can be grasped.

Further, only by dragging and dropping an icon 9 displayed on the desktop 10 onto the window 11 opened according to the display program, all pieces of measurement data corresponding to the icon 9 are automatically displayed with differently colored dots 12 depending on a difference in environmental radiation dose on an appropriate map 12 corresponding to measurement locations without selecting a map that can be determined to be appropriate, and therefore environmental radiation doses can be intuitively recognized.

In addition, in this embodiment, a data file DF for measurement data is created with the portable dosimeter 5 being paired with the smartphone 6 to be carried, so that environmental radiation doses can be measured at any location as long as the location is accessible along with the both carried, and therefore mobility can be exhibited.

Also, for example, even in the case of automatically successively outputting pieces of measurement data in a few seconds or a few tens of seconds to create a plurality of data files each containing many pieces of measurement data, the pieces of measurement data can be extremely easily mapped on a map in an easy-to-see manner.

Note that the present invention is not limited to the above-described embodiment.

In the above-described embodiment, described is an example where measurement data is transmitted from the smartphone 6 to the computer 2 through mail or the like; however, the present invention may be one that utilizes Internet-based application software and storage devices typified by cloud computing or network computing. In such a case, the present invention may be configured to be able to check environmental radiation doses from various locations by, for example, using application software, which can create CSV data usable in the cloud computing, to create a data file, storing the data file in a storage device within the cloud computing, and accessing the storage device through the Internet.

With such a configuration, multiple people other than a measurer can check environmental radiation doses measured at various locations by sharing a storage location on the Internet. Also, in the case of using the cloud computing, application software can also be shared, and therefore a load of each person on browsing measurement data can be reduced.

Further, the present invention may be one that, in place of the smartphone 6, uses a tablet computer equipped with a GPS function, a Bluetooth function, and the like. In this case, the above-described notebook computer 2 is not necessarily required.

As measurement data, ion concentration such as NOx concentration, $CO_2$ concentration, or pH, another environment-related parameter, or still another parameter of which a measurement value can be grasped in relation to a corresponding measurement location is possible.

Besides, it should be appreciated that the present invention is not limited to any of the above-described embodiments, but can be variously modified without departing from the scope thereof.

The invention claimed is:

1. A measurement data display device comprising:
a screen that displays an icon representing a data file in which plural measurement data measured by a predetermined measuring device and plural location data indicating locations where each of the measurement data was measured are recorded in association with each other, and also displays a window for displaying a map; and
a display control part that controls a display on the screen, wherein, when the icon is moved onto the window, a predetermined type of symbol, determined in advance depending each value of the measurement data included in the data file represented by the icon, is displayed in the window at a position on the map, the position being indicated by the location data corresponding to each of the measurement data.

2. The measurement data display device according to claim 1, wherein
the data file includes time data associated with each measurement data and indicating time when the measurement data was measured.

3. The measurement data display device according to claim 1, wherein
when a plurality of the icons are collectively moved onto the window, all pieces of measurement data in data files corresponding to each of the icons are displayed in the window.

4. The measurement data display device according to claim 1, wherein
the display control part sets a scale of the map.

5. The measurement data display device according to claim 4, wherein
the predetermined type of symbol comprises a plurality of symbols corresponding to all pieces of measurement data contained in the data file.

6. The measurement data display device according to claim 4, wherein
the predetermined type of symbol comprises a plurality of the symbols corresponding to all pieces of measurement data related to different locations.

7. The measurement data display device according to claim 1, wherein
a portable terminal supplies the data file which is inputted to the display control part and receives the measurement data from the measuring device.

8. The measurement data display device according to claim 7, wherein
the portable terminal receives the measurement data from the measuring device through short range wireless communication or wired communication.

9. The measurement data display device according to claim 8, wherein
the portable terminal is a smartphone, and the short range wireless communication is based on Bluetooth.

10. The measurement data display device according to claim 1, wherein
the symbol is a dot that is color-coded depending on the value of the measurement data.

11. The measurement data display device according to claim 1, wherein
when a plurality of the icons are collectively moved onto the window, all pieces of measurement data related to different locations on the map are displayed in the window with a plurality of the symbols.

12. The measurement data display device according to claim 1, wherein
the measuring device is portable; and
the portable terminal associates the received measurement data with the location data acquired through a GPS receiving device to create the data file.

13. A measurement data display method comprising:
displaying on a screen an icon representing a data file in which plural measurement data measured by a predetermined measuring device and plural location data indicating locations where each of the measurement data was measured are recorded in association with each other,
a display control part that controls a display on the screen,
displaying a window for displaying a map on the screen and
displaying a predetermined type of symbol, determined in advance depending on each value of the measurement data included in the data file represented by the icon, in the window and at a position on the map when the icon is moved onto the window, the position being indicated by the location data corresponding to each of the measurement data.

14. A non-transitory storage device that stores a measurement data display program instructing a computer that:
displays on a screen of the computer an icon representing a data file in which plural measurement data measured by a predetermined measuring device and plural location data indicating locations where each of the measurement data was measured are recorded in association with each other,
a display control part that controls a display on the screen,
displays a window for displaying a map on the screen, and
displays a predetermined type of symbol, determined in advance depending on each value of the measurement data included in the data file represented by the icon, in the window and at a position on the map when the icon is moved onto the window, the position being indicated by the location data corresponding to each of the measurement data.

* * * * *